US009717970B2

(12) United States Patent
Wortman et al.

(10) Patent No.: US 9,717,970 B2
(45) Date of Patent: Aug. 1, 2017

(54) SLEEVE TO IMPROVE SWINGING MOTION

(71) Applicants: A. Alex Wortman, Ann Arbor, MI (US); Anton Wortman, Ann Arbor, MI (US)

(72) Inventors: A. Alex Wortman, Ann Arbor, MI (US); Anton Wortman, Ann Arbor, MI (US)

( * ) Notice: Subject to any disclaimer, the term of this patent is extended or adjusted under 35 U.S.C. 154(b) by 0 days.

(21) Appl. No.: 15/414,127

(22) Filed: Jan. 24, 2017

(65) Prior Publication Data

US 2017/0128811 A1 May 11, 2017

Related U.S. Application Data

(63) Continuation-in-part of application No. 15/049,840, filed on Feb. 22, 2016, now Pat. No. 9,586,110, which (Continued)

(51) Int. Cl.
*A41D 1/00* (2006.01)
*A63B 69/36* (2006.01)
(Continued)

(52) U.S. Cl.
CPC .......... *A63B 69/3608* (2013.01); *A41D 1/005* (2013.01); *A41D 27/205* (2013.01); *A63B 24/0062* (2013.01); *A63B 69/0002* (2013.01); *A63B 69/38* (2013.01); *A63B 71/0622* (2013.01); *G09B 19/0038* (2013.01); *A63B 2069/0008* (2013.01); *A63B 2071/0625* (2013.01); *A63B 2071/0655* (2013.01); *A63B 2220/17* (2013.01); *A63B 2220/30* (2013.01); *A63B 2220/40* (2013.01); *A63B 2220/56* (2013.01); *A63B 2220/803* (2013.01); *A63B 2225/50* (2013.01)

(58) Field of Classification Search
CPC ...... A41D 27/10; A41D 1/002; A41D 1/1281; A41D 13/0015; A41D 13/00; A41D 2600/00; A41D 2600/10; A41D 1/00; A41D 1/005; A41D 13/088; A41B 1/00; A41B 1/02; A41B 1/08; A41B 1/18; A63B 57/00; A63B 69/36; A63B 69/3641; A63B 69/3608; A63B 69/0057; A63B 69/0059
USPC ............... 2/16, 59, 69, 108, 115, 113, 243.1
See application file for complete search history.

(56) References Cited

U.S. PATENT DOCUMENTS 7,602,301 B1 * 10/2009 Stirling ................ A61B 5/1124
340/573.1
7,770,473 B2 8/2010 Von Lilienfeld-Toal et al.
(Continued)

*Primary Examiner* — Gloria Hale
(74) *Attorney, Agent, or Firm* — Brinks Gilson & Lione

(57) ABSTRACT

A sleeve for improving a swinging motion of a user wearing the sleeve includes a tubular portion and a primary member. The tubular portion has a first opening and a second opening. The tubular portion configured to directly engage an arm portion of the user, wherein the arm portion extends from the first opening to the second opening. The primary member is substantially adjacent a first opening of the tubular portion, wherein the primary member is removably attached or permanently attached to the sleeve. The thickness of the primary member is greater than a thickness of the tubular portion for providing feedback to the user when the primary member is in contact with a torso of the user.

23 Claims, 6 Drawing Sheets

Related U.S. Application Data is a continuation-in-part of application No. 14/601,546, filed on Jan. 21, 2015, now Pat. No. 9,283,452.

(60) Provisional application No. 61/929,682, filed on Jan. 21, 2014, provisional application No. 61/938,789, filed on Feb. 12, 2014.

(51) Int. Cl.

| | | |
|---|---|---|
| *A63B 71/06* | (2006.01) | |
| *A41D 27/20* | (2006.01) | |
| *A63B 24/00* | (2006.01) | |
| *A63B 69/00* | (2006.01) | |
| *A63B 69/38* | (2006.01) | |
| *G09B 19/00* | (2006.01) | |

(56) References Cited

U.S. PATENT DOCUMENTS

| | | | | |
|---|---|---|---|---|
| 8,083,693 | B1* | 12/2011 | McKeon | A61B 5/103 600/587 |
| 2003/0170599 | A1* | 9/2003 | Hart | A63B 69/3608 434/252 |
| 2008/0139969 | A1* | 6/2008 | Gough | A61B 5/1126 600/595 |
| 2009/0024062 | A1* | 1/2009 | Einarsson | A41D 13/1281 600/595 |
| 2009/0047645 | A1* | 2/2009 | Dibenedetto | H04M 1/72563 434/258 |
| 2009/0048070 | A1* | 2/2009 | Vincent | A63B 24/0021 482/8 |
| 2009/0258719 | A1* | 10/2009 | Wortman | A63B 69/3608 473/221 |
| 2010/0042026 | A1* | 2/2010 | Kloecker | A61F 5/34 601/149 |
| 2010/0110169 | A1* | 5/2010 | Zerkin | A61B 5/1121 348/77 |
| 2012/0183939 | A1* | 7/2012 | Aragones | A63B 24/0006 434/247 |
| 2012/0212505 | A1* | 8/2012 | Burroughs | G06F 19/3481 345/629 |
| 2012/0268592 | A1* | 10/2012 | Aragones | G06F 19/3481 348/143 |
| 2014/0012161 | A1* | 1/2014 | Ross, Jr. | A41D 27/10 600/595 |
| 2014/0090146 | A1* | 4/2014 | Yeomans | A41D 1/002 2/69 |
| 2015/0202506 | A1* | 7/2015 | Wortman | A41D 13/0015 2/69 |

* cited by examiner

SLEEVE TO IMPROVE SWINGING MOTION

CROSS REFERENCE TO RELATED APPLICATION

This application is a continuation in part of U.S. patent application Ser. No. 15/049,840 filed on Feb. 22, 2016, which is a continuation in part of U.S. patent application Ser. No. 14/601,546 filed on Jan. 21, 2015, which claimed the benefit of U.S. Provisional Application No. 61/929,682 filed on Jan. 21, 2014 and U.S. Provisional Application No. 61/938,789 filed on Feb. 12, 2014, all of which are herein incorporated by reference in their entirety.

BACKGROUND

1. Field of the Invention

The invention generally relates to sports training devices for improving a swinging motion of a user, especially a swinging motion relating to the sport of golf.

2. Description of Related Art

Golf, like other sports that require an arm swinging motion, is a sport that requires a significant amount of finesse. As a golfer swings at a golf ball, even the slightest variation of the golfer's swing can affect the distance and direction the golf ball travels. As it is well known, golfers spend significant amounts of time and resources to improve their swinging performance.

It has been observed that golfers, especially new golfers when attempting to hit the golf ball, struggle to produce a proper and effective swing path. On the backswing, there is a tendency for new golfers to not make a suitable full shoulder turn. On the downswing, there is a tendency for new golfers to go "over-the-top." An "over-the-top" swing is a swing from the outside to the inside of a target line. Finally, there is a tendency for untrained golfers not to finish the full swing cycle by completely following the swing through.

Prior art solutions are generally limited to personal trainers or cumbersome training devices that are not suitable for everyday use. Some of these cumbersome devices are embarrassing to use in public, as they required the user to wear an apparatus that was readily noticeable as a training device. Additionally, because these prior art devices are not suitable for everyday use, golfers, especially untrained golfers, do not receive the constant feedback necessary to develop a proper golf swing.

SUMMARY

A sleeve for improving a swinging motion of a user wearing the sleeve includes a tubular portion and a primary member. The tubular portion has a first opening and a second opening. The tubular portion configured to directly engage an arm portion of the user, wherein the arm portion extends from the first opening to the second opening. The primary member is substantially adjacent a first opening of the tubular portion, wherein the primary member is removably attached or permanently attached to the sleeve. The thickness of the primary member is greater than a thickness of the tubular portion for providing feedback to the user when the primary member is in contact with a torso of the user.

The sleeve may also include a secondary member. The secondary member is located between the first opening and the second opening of the tubular portion. The secondary member having a thickness that is greater than a thickness of the tubular portion for providing feedback to the user when the secondary member is in contact with a torso of the user.

The primary and/or secondary members may also include a processor, a network access device and at least one sensor. The processor is in communication with the network access device and the at least one sensor. The processor is configured to determine at least one characteristic of the swinging motion of the user based on information received from the at least one sensor Further objects, features and advantages of this invention will become readily apparent to persons skilled in the art after a review of the following description, with reference to the drawings and claims that are appended to and form a part of this specification.

DETAILED DESCRIPTION

Figure 1:
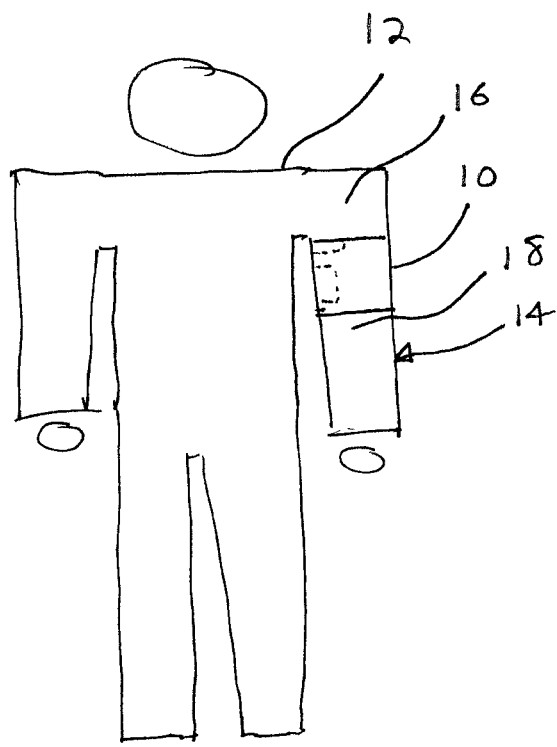
FIG. 1 illustrates a sleeve for improving a swinging motion on the user.

FIG. 1 illustrates a sleeve 10 on a user 12 for improving the swinging motion for the user 12 wearing the sleeve 10. Generally, the sleeve is located on an arm 14 of the user 12 between a shoulder 16 and an elbow 18 of the user 12. While this example only illustrates the sleeve 10 located on one arm of the user 12, it should be understood that the sleeve 10 may be located on the other arm of the user 12 or may also be located on both arms of the user. In that situation, there would be two sleeves utilized on each arm of the user 12.

Figure 2:
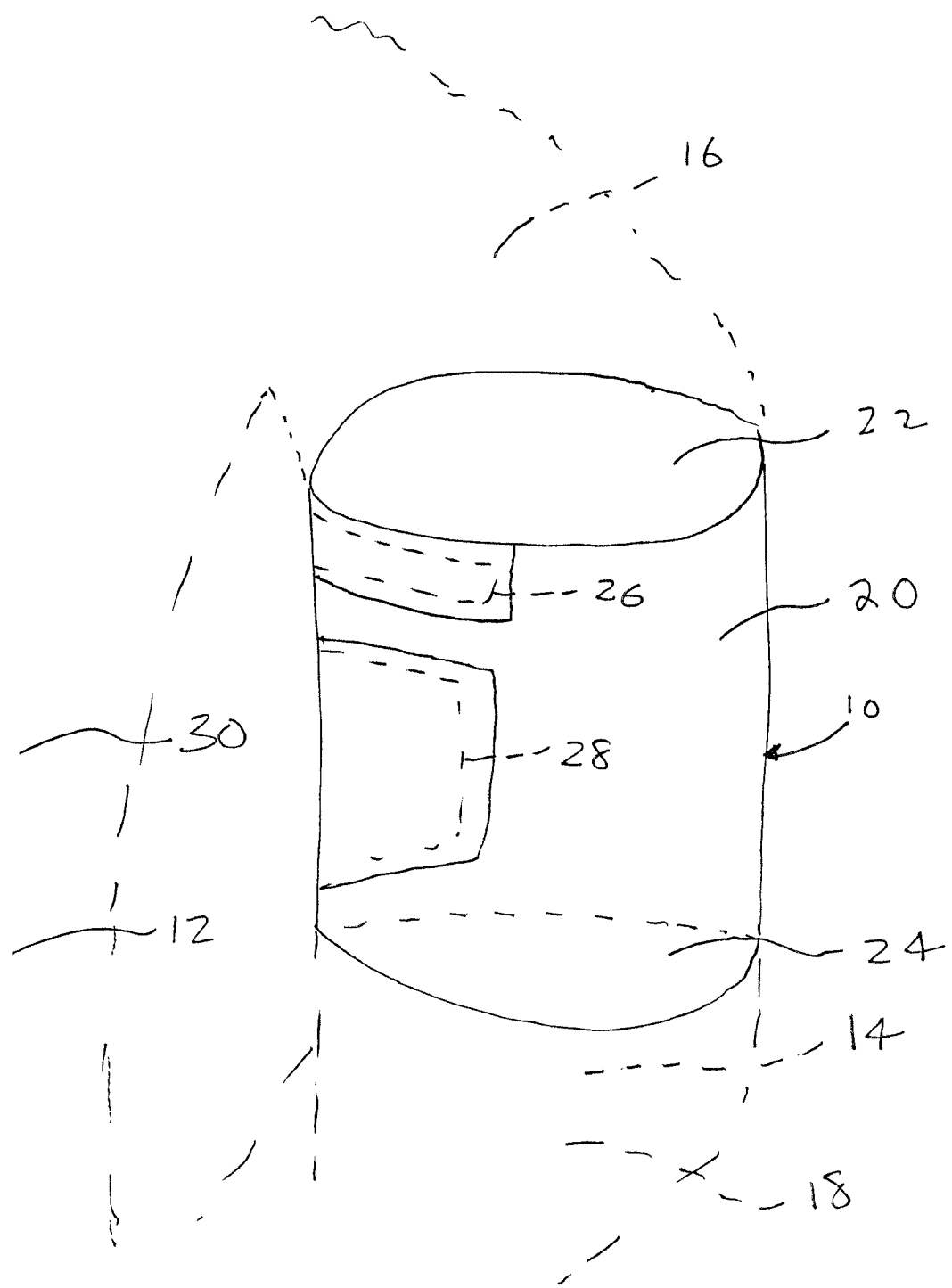
FIGS. 2 and 3 illustrate a more detailed view of the sleeve for improving a swinging motion of the user.
Figure 3:
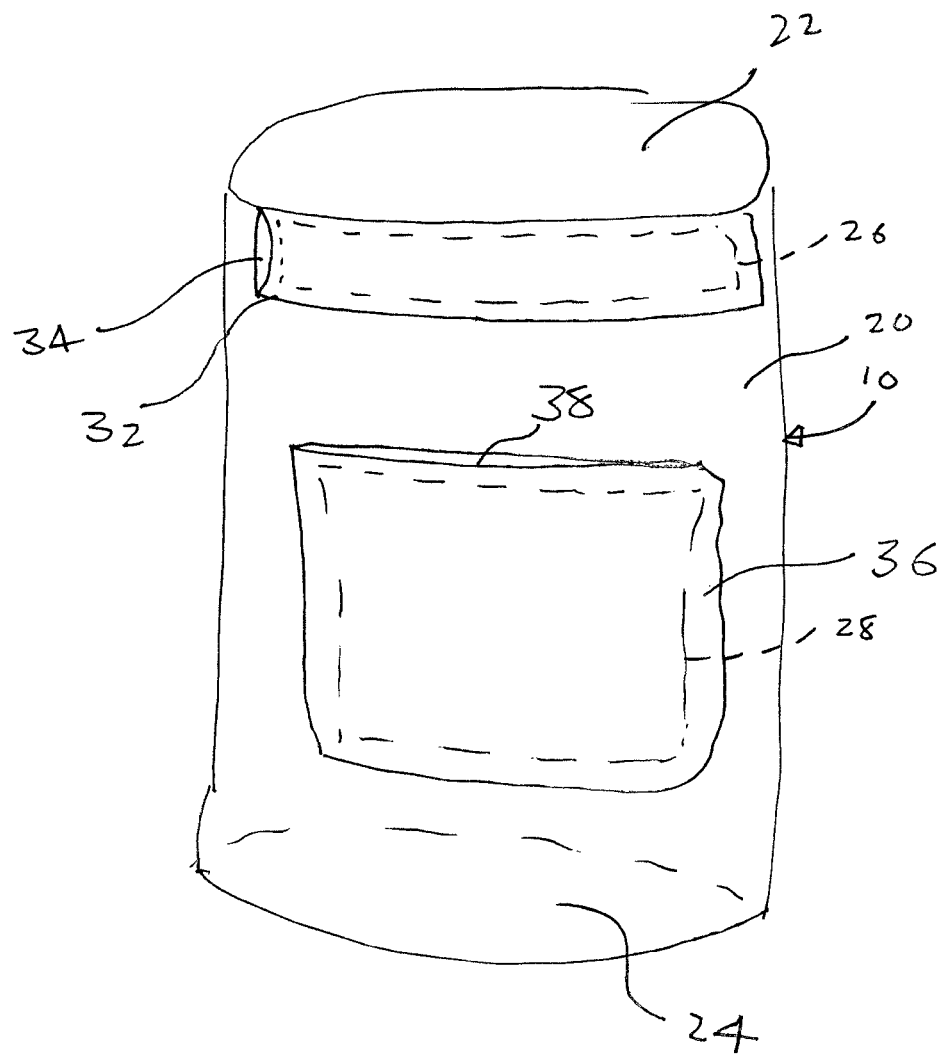

Referring to FIGS. 2 and 3, a more detailed view of the sleeve is shown. Here, the sleeve includes a tubular portion 20 that generally extends between a first opening 22 and a second opening 24. The arm 14 of the user is put through the tubular portion 20 of the sleeve 10 such that only the portion of the arm 14 located between the shoulder 16 and the elbow 18 is in contact with the sleeve 10.

The tubular portion 20 is configured to directly engage the arm portion of the user 12. As such, the sleeve portion may be made out of a flexible material so as to directly engage different sized arms 14 of different users 12. For example, the tubular portion 10 may be made out of a stretchy material, such as nylon or neoprene. Here, the sleeve 10 includes a primary member 26 that is substantially adjacent to the first opening 22 of the tubular member 20. The primary member 26 may be permanently or removably attached to this portion of this sleeve 10. Generally, the thickness of the primary member 26 is greater than the thickness of the tubular portion 20. This is so that the primary member provides some form of physical feedback to the user 12 of the sleeve 10 when the primary member 26 comes into contact with a torso 30 of the user 12.

As to the secondary member 28, the secondary member 28 is generally located between the first opening 22 and the second opening 24 generally along the length of the tubular portion 20. It should be understood that while the terms primary member 26 and secondary member 28 have been utilized, the sleeve 10 may only include the secondary member 28 or may only include the primary member 26. Furthermore, it is possible that the sleeve 10 may include both the primary member 26 and the secondary member 28. As such, no indicator of greater importance should be given regarding the terms "primary" and "secondary."

As to the secondary member 28, the secondary member 28, like the primary member 26, may be made of a material having a thickness greater than that of the tubular portion 20. In like manner, this provides feedback to the user 12 when the secondary member 28 comes into contact with the torso 30 of the user 12. The primary member 26 and/or secondary member 28 may be made of a flexible material such as a foam rubber, that contours to the arm of the user 12, but still provides a form of tactile feedback to the user 12 when the primary member 26 and/or secondary member 28 come into contact with a torso 30 of the user 12.

Referring to FIG. 3, the primary member 26 and/or secondary member 28 may be permanently or removably attached to the tubular portion 20 of the sleeve 10. In this example, the sleeve 10 includes a pouch 32 having an opening 34 for allowing the primary member 26 to be easily inserted or removed from the pouch 32. In like manner, the secondary member 28 may also be retained to the sleeve 20 by pouch 36 having an opening 38 that allows the secondary member 28 to be easily inserted or removed from the sleeve 10.

Figure 4:
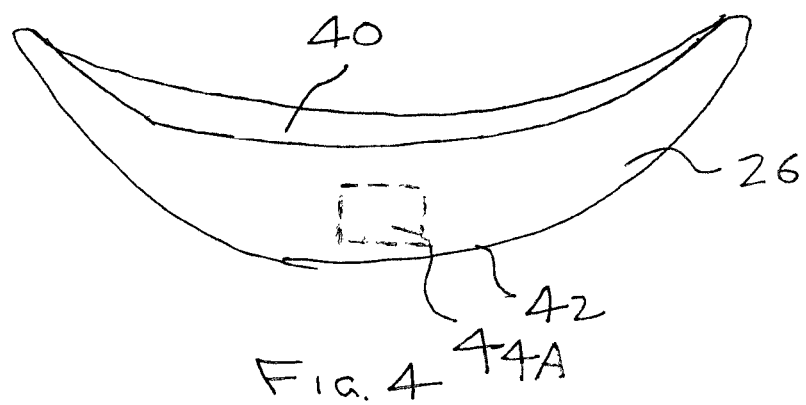
FIG. 4 illustrates a more primary member of the sleeve.

Referring to FIG. 4, a more detailed view of the primary member 26 is shown. Here, the primary member 26 includes an internal side 40 and an external side 42. The internal side 42 may have a flat surface with a curvature closely mimicking that of the curvature defined by the opening 22, as best shown in FIG. 3. The outside 42 may also have a curvature that closely mimics the curvature of the opening 22 defined by the edges of the opening 22. Finally, as will be explained in more detail in the paragraphs that follow, the primary member 26 may have an electronic component 44*a* may be capable of measuring the movement of the arm 14 of the user with pressure applied by the user against the primary member 26.

Figure 5:
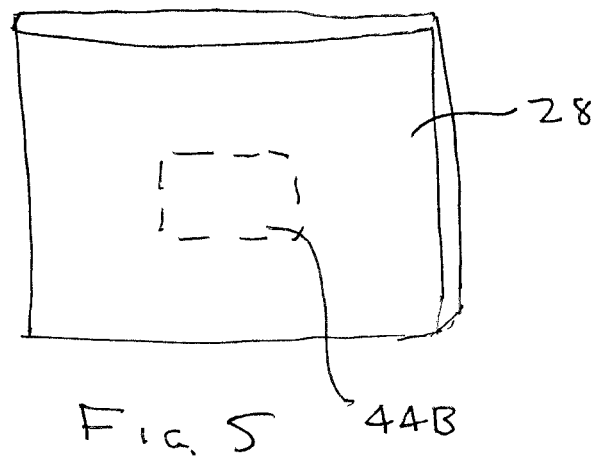
FIG. 5 illustrates a more detailed view of the secondary member of the sleeve.

Referring to FIG. 5, a more detailed view of the secondary member 28 is shown. In this embodiment, a secondary member 28 is generally rectangular in shape. Like the primary member 26, the secondary member 28 may also contain an electronic component 44*b*, which will be explained in the paragraphs that follow in greater detail that can measure the movement of the arm 14 of the user 12 or the amount of pressure applied to the secondary member 28 by the user 12.

Further, it should be understood that the primary member 26 and/or secondary member 28 may be made out of a number of different materials that may be flexible in nature, such as foam or may be a flexible capsule filled in part with a flexible material. Additionally, the primary member 26 and/or secondary member 28 may be an inflatable system, wherein the primary member 26 and/or secondary member 28 inflates to a specified shape.

However, the primary member 26 and/or secondary member 28 may also be made of a non-flexible material, entirely or in additional to a non-flexible material. Such materials may include plastic, wood, cork, wire mesh, tin or any other type of solid material. Further, the primary member 26 and/or secondary member 28 may be an oversized golf tee or pencil or any other suitable device. The primary member 26 and/or secondary member 28 may be a non-flexible material wrapped with a flexible material.

As stated above, the primary member 26 and/or secondary member 28 may also include one or more sensors that can measure body vitals. These sensors can include sensors that are designs to measure, body or skin temperature, heart rate, oxygen saturation, or other vital signs. Additionally, the primary member 26 and/or secondary member 28 may include sensors to measure pressure or movement. For example, the primary member 26 and/or secondary member 28 could include one or more sensors, such as accelerometers or gyroscopes that measure if a swing has occurred. Based on the swing occurring, audio or tactile feedback could be given to the user if the swing was properly made, such as being followed through or if a full swing has occurred, such as mentioned in U.S. Patent Publication 2009/0258719 (U.S. patent application Ser. No. 12/269, 158), which is herein incorporated by reference in its entirety.

The primary member 26 and/or secondary member 28 could also track the number of swings taken or the velocity of the swings taken. Data, such as shots taken or other related data could be stored in the member and then later downloaded either by a wired or wireless connection to a secondary device, such as a mobile phone or general purpose computer.

Figure 6:
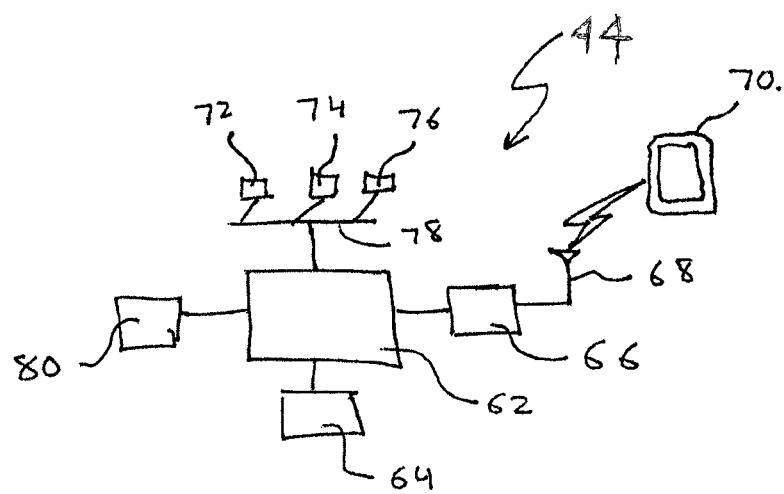
FIG. 6 illustrates a more detailed view of the electronics that may be located within the primary and/or secondary members of FIGS. 4 and/or 5 or the sleeve of FIG. 7.

Referring to FIG. 6, the electronic device 44 (which may be electronic device 44*a* or electronic device 44*b*) includes a processor 62. The processor 62 may be a single standalone processor or may be a plurality of processors acting in concert. The processor 62 may be in communication with a memory device 64 that is capable of storing instructions and or logging data for configuring the processor to perform any one of a number of tasks described in this specification.

The processor 62 may also be in communication with a network access device 66. The network access device 66 may be in communication with an antenna 68. When configured thusly, the network access device 66 allows the processor 62 to communicate with a third party device 70 via the antenna 68. Essentially, the network access device 66 may be a Bluetooth or Wi-Fi type device that allows communication with the mobile device 70 via the antenna 68. The third party device 70 may be any one of a number of different devices, such as a mobile phone or tablet device. Examples of these devices could include an iPhone from Apple, Inc. or a Galaxy S7 from Samsung Electronics, Inc.

The processor 62 may also be connected to a variety of sensors 72, 74, and 76. These sensors may be any one of a number of different sensors or may just be a single sensor. For example, the sensor 72 may be an accelerometer to measure the movement of primary member 26 and/or secondary member 28. This could be helpful in determining the swing motion of the user of primary member 26 and/or secondary member 28. Sensor 74 could be a pressure sensor so as to be able to determine if the user of primary member 26 and/or secondary member 28 is squeezing primary member 26 and/or secondary member 28 so as to maximize their swing motion.

Additionally, as will be described in FIG. 7, the sensor or sensors 72, 74, and/or 76 could also be at least one conductive trace, such as conductive thread, having a pressure sensitive layer having a pressure-dependent electric characteristic. The conductive traces being located on, within or forming at least one of the front panel, rear panel or the at least one tubular sleeve. An example of conductive traces or threads being used as pressure sensors are shown in U.S. Pat. No. 7,770,473, which is herein incorporated by reference in its entirety.

This "squeeze factor" can be important when determining if the user of primary member 26 and/or secondary member 28 is appropriately swinging. The sensor 76 may be a type of sensor that is configured to measure body vitals, such as heart rate or other vital signals.

The sensors 72, 74, and 76 may be in communication with the processor directly or via a bus 78. As such, the processor 62 can record data received from the sensors 72, 74, and 76 and store this data in the memory 64. Information stored in the memory 64 can then be transmitted to the mobile device 70 via the network access device 66.

The electronic device 44 may also have a physical feedback device 80. The physical feedback device 80 may be a small vibration device or could be an audible device. Essentially, based on information received from the sensor 72, 74, and 76, the processor 62 can be configured to provide some form of feedback via the feedback device 80 to the user of primary member 26 and/or secondary member 28.

By providing feedback to the user of primary member 26 and/or secondary member 28 via the feedback device 80 or via the mobile device 70, the user of primary member 26 and/or secondary member 28 will, over time, develop better sensory systems so as to approve the swinging motion. This improvement in the swinging motion may start slowly at first, but with additional feedback, the user of the device 54C will develop better sensory systems and control of their swinging motion, eventually resulting in a much better swing.

Figure 7:
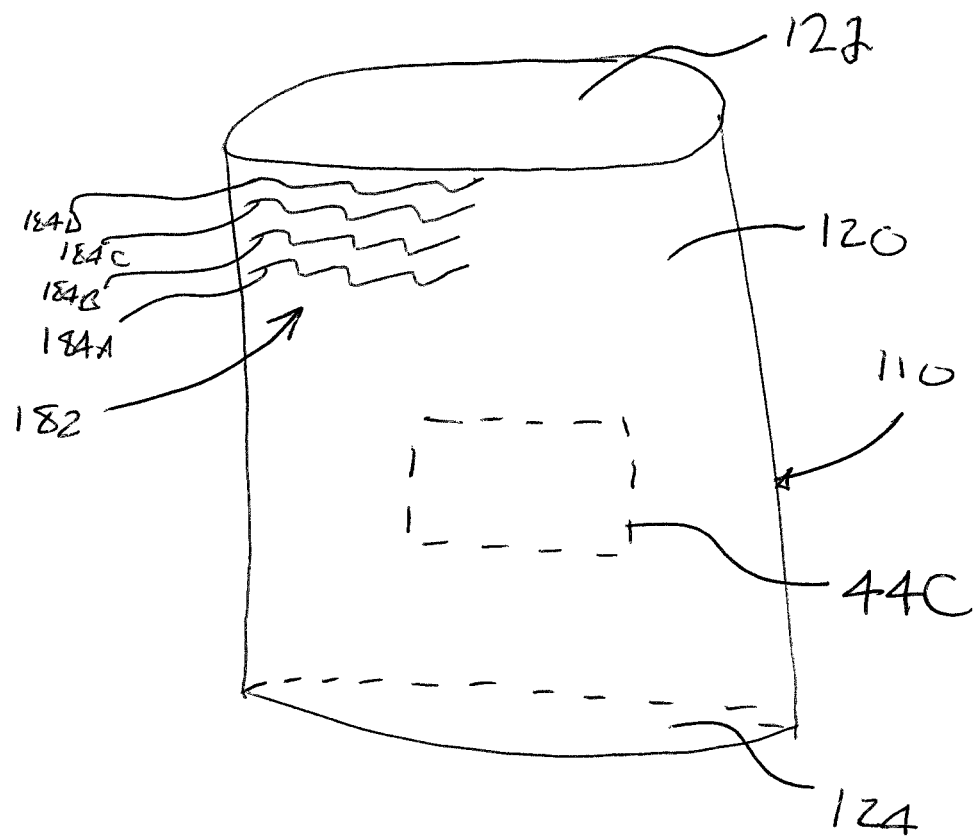
FIG. 7 illustrates a sleeve for improving a swinging motion on the user, the sleeve utilizes conductive traces to measure one or more characteristics.

Referring to FIG. 7, another embodiment of the sleeve 110 is shown. In this embodiment, like reference numerals, incremented by 100, have been utilized to refer to like elements, so no further description of these elements is provided as the previous description is equally applicable.

Here, the sleeve 110 utilizes at least one conductive trace 182, which could be one or more conductive threads, as shown as traces 184A-184D. The conductive traces 184A-184D are woven into the material of the sleeve 110. The purpose of the conductive traces 184A-184D are to determine pressure, or other characteristic, in the region where the conductive traces 184A-184D are located. Further, while the conductive traces 184A-184D function to measure pressure or another characteristic, a member, such as the members described in the previous figures may be utilized. An example of conductive threads being used as pressure sensors are shown in U.S. Pat. No. 7,770,473, which is herein incorporated by reference in its entirety.

It should be understood that while FIG. 7 does not show members 26 and/or 28, it should be understood that these members, or just one member, could be incorporated within the sleeve 110 of FIG. 7. The opposite is also true in that the sleeve 110 may not include any of the members 26 and/or 28. Any member 26 and/or 28 utilized may not need the sensors described in FIG. 6 as the conductive traces 184A-184D measure one or more characteristics. Further, it should be understood a member 26 or a member 28, such as shown in the prior figures, no member may be used at all. In this case, electronic device 44C, which is similar to the electronic device 44 described in FIG. 6, could be located in, on, or near the sleeve 110 so as to receive signals from the conductive traces 184A-184D and then provide this information to an external device, such as a smartphone, personal computer, smartwatch, etc.

In sports such as golf, baseball, and tennis, the user seeks the development of an effective swing—an athletic swing that will prove successful in getting the club, bat or racquet to strike the ball with accuracy, power, and consistency. In attempting to deliver an effective athletic swing, it is advantageous if the arms of the athlete retain their connection to the body—up against, or in close proximity to the rib cage.

The benefit of the sleeve 10 is that it helps the user to position and guide his arms and shoulders in the course of the swing. Rather than trying hard to remember and apply a long list of detailed instructions on how exactly to position oneself and on how to properly keep the upper arms connected to the body throughout the swing, the attached placement of the member 54 provides the user with a secured 'sensory guide' that does not drop to the ground or slide out of place as the golfer positions himself at address, and directs the turning and swinging of his shoulders and arms. As the 'body-mapping' inventive apparel organizes the muscles and provides the player with heightened sensory awareness, it allows him to swing basically by feel as opposed to becoming overly engaged in swing thoughts.

As a person skilled in the art will readily appreciate, the above description is meant as an illustration of an implementation of the principles this invention. This description is not intended to limit the scope or application of this invention in that the invention is susceptible to modification, variation, and change, without departing from the spirit of this invention, as defined in the following claims.

The invention claimed is:

1. A sleeve for improving a swinging motion of a user wearing the sleeve, the sleeve comprising:
   a tubular portion having a first opening and a second opening, the tubular portion configured to directly engage an arm portion of the user, wherein the arm portion of the user extends from the first opening to the second opening, the arm portion being a portion of an arm of the user being located between a corresponding shoulder and elbow of the user;
   a primary member substantially adjacent a first opening of the tubular portion for providing feedback to the user during the swinging motion to improve the swinging motion of the user, wherein the primary member is removably attached or permanently attached to the sleeve;
   wherein a thickness of the primary member is greater than a thickness of the tubular portion for providing feedback to the user when the primary member is in contact with a torso of the user during the swinging motion; and
   wherein the primary member is a flexible member.

2. The sleeve of claim 1, wherein the primary member has a side that is substantially flat along a curvature that follows a length of the primary member.

3. The sleeve of claim 1, wherein the primary member has a curvature substantially similar to a curvature of an edge of the first opening of the tubular portion.

4. The sleeve of claim 1, wherein the primary member is permanently attached to an edge of the first opening of the tubular portion.

5. The sleeve of claim 1, wherein the primary member is removably attached to an edge of the first opening of the tubular portion.

6. The sleeve of claim 5, further comprising a pouch being located adjacent to an edge of the first opening of the tubular portion, the pouch being permanently coupled to the tubular portion, the pouch being in fluid communication with an opening configured to receive the primary member for allowing the primary member to be easily inserted or removed from the pouch.

7. The sleeve of claim 1, wherein the primary member emits a visual, audible or tactile output.

8. The sleeve of claim 1, wherein the primary member further comprises a processor, a network access device, and at least one sensor, wherein the processor is in communication with the network access device and the at least one sensor, the processor being configured to determine at least one characteristic of a swinging motion of the user based on information received from the at least one sensor.

9. The sleeve of claim 8, wherein the processor is configured to transmit at least one characteristic of the swinging motion of the user to an external device via the network access device.

10. The sleeve of claim 9, wherein the at least one characteristic is at least one of:
   a measurement of a movement of the primary member; or
   a measurement of a pressure applied by the user to the primary member.

11. A sleeve for improving a swinging motion of a user wearing the sleeve, the sleeve comprising:
   a tubular portion having a first opening and a second opening, the tubular portion configured to directly engage an arm portion of the user, wherein the arm portion of the user extends from the first opening to the second opening, the arm portion being a portion of an arm of the user being located between a corresponding shoulder and elbow of the user;
   a primary member substantially adjacent a first opening of the tubular portion for providing feedback to the user during the swinging motion, wherein the primary member is removably attached or permanently attached to the sleeve;
   wherein a thickness of the primary member is greater than a thickness of the tubular portion for providing feedback to the user when the primary member is in contact with a torso of the user during the swinging motion;
   a secondary member located between the first opening and the second opening of the tubular portion;
   the secondary member having a thickness that is greater than a thickness of the tubular portion for providing feedback to the user when the secondary member is in contact with a torso of the user; and
   wherein the secondary member is removably attached or permanently attached to the sleeve.

12. The sleeve of claim 11, wherein the secondary member is a flexible member.

13. The sleeve of claim 11, wherein the secondary member is permanently attached to the tubular portion of the sleeve at a location between the first of second openings of the tubular portion of the sleeve.

14. The sleeve of claim 11, wherein the secondary member is removably attached to the tubular portion of the sleeve at a location between the first of second openings of the tubular portion of the sleeve.

15. The sleeve of claim 14, further comprising:
   a pouch being located adjacent to the tubular portion at a location between the first of second openings of the tubular portion;
   the pouch being permanently coupled to the tubular portion, the pouch being in fluid communication with an opening configured to receive the secondary member for allowing the secondary member to be easily inserted or removed from the pouch.

16. The sleeve of claim 11, wherein the secondary member emits a visual, audible or tactile output.

17. The sleeve of claim 11, wherein the secondary member further comprises a processor, a network access device, and at least one sensor, wherein the processor is in communication with the network access device and the at least one sensor, and the processor being configured to determine at least one characteristic of the swinging motion of the user based on information received from the at least one sensor.

18. The sleeve of claim 17, wherein the processor is configured to transmit at least one characteristic of a swinging motion of the user to an external device via the network access device.

19. The sleeve of claim 18, wherein the at least one characteristic is at least one of:
   a measurement of a movement of the secondary member; or
   a measurement of a pressure applied by the user to the secondary member.

20. A sleeve for improving a swinging motion of a user wearing the sleeve, the sleeve comprising:
   a tubular portion having a first opening and a second opening, the tubular portion configured to directly engage an arm portion of the user, wherein the arm portion of the user extends from the first opening to the second opening, the arm portion being a portion of an arm of the user being located between a corresponding shoulder and elbow of the user; and
   at least one conductive trace configured to measure at least one characteristic of a swinging motion of the user, the at least one conductive trace being located on, within or forming the sleeve.

21. The sleeve of claim 20, wherein the at least one conductive trace has a pressure sensitive layer.

22. The sleeve of claim 20, further comprising comprises a processor, a network access device, wherein the processor is in communication with the network access device and the at least one conductive trace, the processor being configured to determine at least one characteristic of a swinging motion of the user based on information received from the at least one conductive trace.

23. The sleeve of claim 20, wherein the processor is configured to transmit at least one characteristic of the swinging motion of the user to an external device via the network access device.

* * * * *